(12) United States Patent
McCool et al.

(10) Patent No.: US 8,712,997 B2
(45) Date of Patent: Apr. 29, 2014

(54) METHODS AND SYSTEMS FOR OPTIMIZING DATA ACCESSES

(75) Inventors: Michael David McCool, Waterloo (CA); Stefanus Jakobus Du Toit, Kitchener (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/410,019

(22) Filed: Mar. 1, 2012

(65) Prior Publication Data
US 2012/0166418 A1    Jun. 28, 2012

Related U.S. Application Data

(63) Continuation of application No. 11/777,716, filed on Jul. 13, 2007, now Pat. No. 8,145,625.

(51) Int. Cl.
*G06F 17/30*    (2006.01)
(52) U.S. Cl.
USPC ............................ 707/715; 707/796; 707/802
(58) Field of Classification Search
None
See application file for complete search history.

(56) References Cited

U.S. PATENT DOCUMENTS

| 7,073,133 | B2 | 7/2006 | Hughes et al. |
| 2003/0068097 | A1 | 4/2003 | Wilson et al. |
| 2005/0131919 | A1 | 6/2005 | Brookler et al. |

OTHER PUBLICATIONS

Non-Final Office Action mailed Sep. 11, 2009 for U.S. Appl. No. 11/777,716.
Final Office Action mailed Apr. 26, 2010 for U.S. Appl. No. 11/777,716.
Notice of Allowance mailed Nov. 25, 2011 for U.S. Appl. No. 11/777,716.

*Primary Examiner* — Anteneh Girma
(74) *Attorney, Agent, or Firm* — Blakely, Sokoloff, Taylor & Zafman LLP

(57) ABSTRACT

A method for optimizing data types includes the step of generating a data structure providing access to at least one data element, the data structure associated with a first representation of the at least one data element. A user is provided with a plurality of data types for accessing the at least one data element. A request for access to the at least one data element is received, the request including at least one of the plurality of data types. The request is responded to with a second representation of the at least one data element, the second representation generated responsive to the at least one of the plurality of data types.

21 Claims, 5 Drawing Sheets

METHODS AND SYSTEMS FOR OPTIMIZING DATA ACCESSES

The present application is a Continuation of, and claims priority to and incorporates by reference, the corresponding U.S. patent application Ser. No. 11/777,716 filed Jul. 13, 2007, and entitled "Methods and Systems for Optimizing Data Accesses," and issued as U.S. Pat. No. 8,145,625 on Mar. 27, 2012.

FIELD OF THE INVENTION

The present invention relates to methods and systems for optimizing data access. In particular, the present invention relates to methods and systems for generating data structures providing optimized access to data elements.

BACKGROUND OF THE INVENTION

A new generation of massively parallel processors, including graphics processing units (CPUs), the IBM Cell BE processor, and other multi-core or vector processors, can offer faster computation than traditional processors by an order of magnitude. Achieving the potential performance of these processors typically requires a detailed understanding of processor hardware and memory architectures as well as of sophisticated parallel programming techniques. For example, typically programming applications for graphical processing units may require programmers to learn a large number of graphics concepts as well as understanding different optimizations required to achieve optimum performance in an environment in which the cache, memory and execution architectures may differ significantly from that of traditional processing units. Additionally, parallel programming itself is not intuitive for many programmers, as it requires techniques and algorithms that are not required for traditional serial programming and introduces numerous new development and debugging challenges.

BRIEF SUMMARY OF THE INVENTION

Because of the memory, communication, processing, and architectural features of massively parallel processors, new development approaches and programming systems may be used to improve the level of performance achievable with these processors. One system that may be used to improve a performance level includes a set of data types and operations that provide a user with meaningful and useful primitives and allows high-performance implementations of the user's programs. In one aspect, systems and methods for optimizing data accesses provide users with three abstractions: an abstraction of data types having optimized assignment semantics, an abstraction of data elements, and an abstraction of optimized methods for generating the data types and operating on the data elements.

In one aspect, a method for optimizing data access includes the step of generating a data structure providing access to at least one data element, the data structure associated with a first representation of the at least one data element. A user is provided with a plurality of data types for accessing the at least one data element. A request for access to the at least one data element is received, the request including at least one of the plurality of data types. The request is responded to with a second representation of the at least one data element, the second representation generated responsive to the at least one of the plurality of data types.

In one embodiment, the first representation stores a copy of the at least one data element. In another embodiment, each of the data types in the plurality of data types are associated with the data structure providing access to the at least one data element. In still another embodiment, a data type in the plurality of data types has by-value semantics. In still even another embodiment, a data type in the plurality of data types has by-reference semantics. In yet another embodiment, a data type in the plurality of data types providing dereferenced access to the at least one data element.

In one embodiment, a data type providing access to the second representation is identified, the data type having an assignment semantic selected responsive to an analysis of the at least one of the plurality of data types included in the request. In another embodiment, the request for access to the at least one data element is responded to with an optimized representation of the at least one data element, the optimized representation generated responsive to an analysis of a hardware component on which the at least one data element resides. In still another embodiment, the request for access to the at least one data element is responded to with an optimized representation of the at least one data element, the optimized representation generated responsive to an analysis of the at least one data element. In still even another embodiment, the request for access to the at least one data element is responded to with an optimized representation of the at least one data element, the optimized representation generated responsive to an analysis of a memory layout of the at least one data element.

In another aspect, a system for optimizing data access includes a data structure providing access to at least one data element, a first representation of the at least one data element, a plurality of data types for accessing the at least one data element, and a second representation of the at least one data element, the representation generated responsive to at least one of the plurality of data types.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
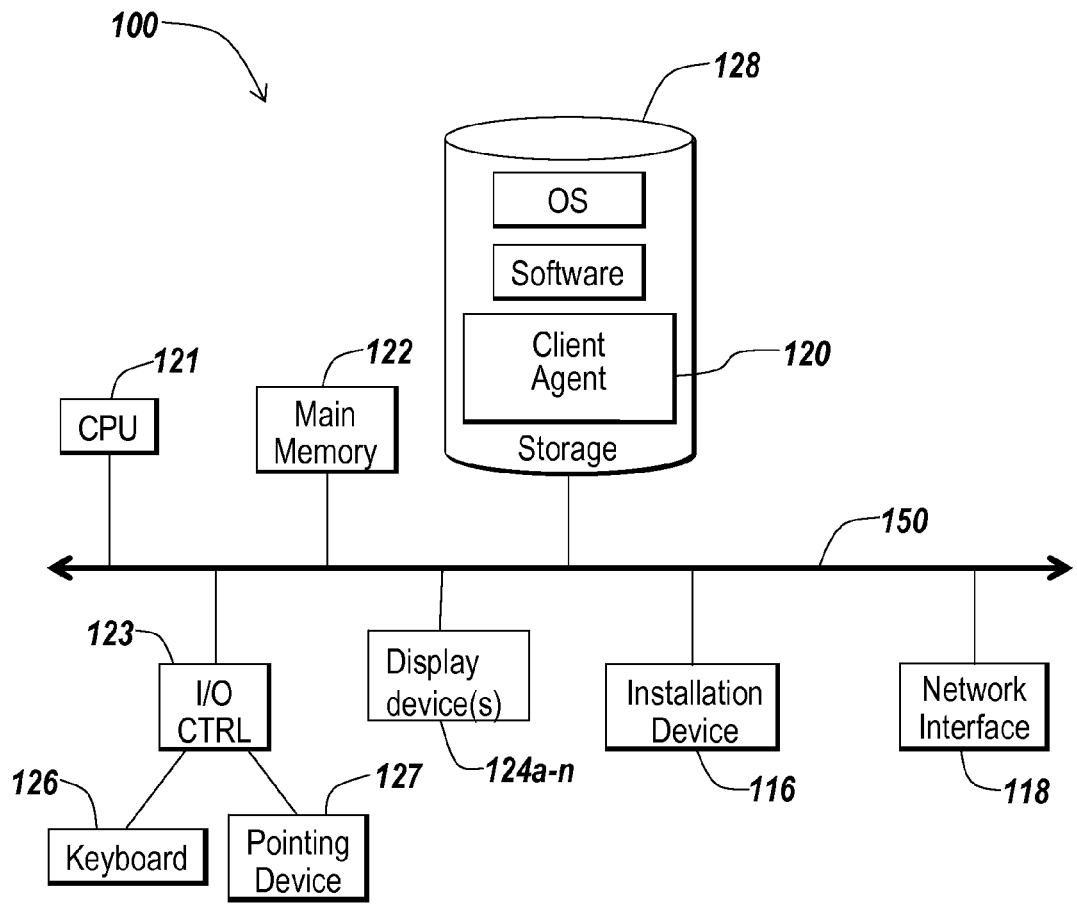
FIGS. 1A-1C are block diagrams depicting an embodiment of a computer useful in connection with the methods and systems described herein.

FIG. 1A depicts a block diagram of a computing device 100 useful for practicing an embodiment of a method for optimizing data access. As shown in FIG. 1, each computing device 100 includes one or more central processing units 121, and one or more main memory units 122. As shown in FIG. 1, a computing device 100 may include a visual display device 124, a keyboard 126 and/or a pointing device 127, such as a mouse. A computing device may also include installation devices, which may or may not be the same as the central processing units.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; those manufactured by Sun Microsystems Inc. of Mountain View, Calif.; or those manufactured by Advanced Micro Devices of Sunnyvale, Calif. The computing device 100 may be based on any of these processors, or any other processor capable of operating as described herein.

Figure 1B:
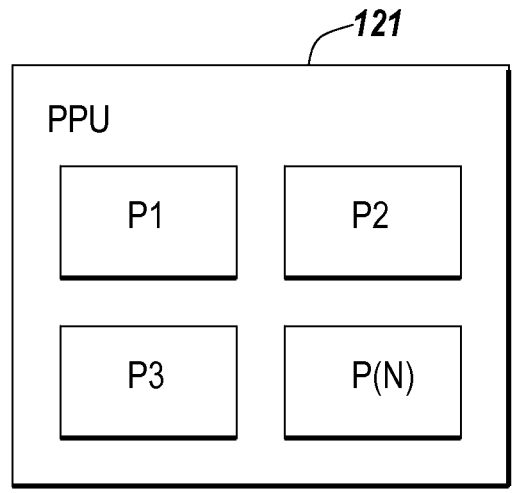
Figure 1C:
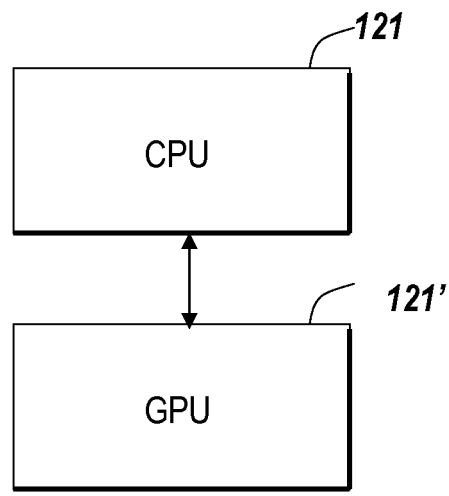

As shown in FIG. 1B, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1C, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurlality of processing units of any type, one of the plurality of processing units comprising a graphics processing unit.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices and/or the I/O controller 123 may comprise any type and/or form of suitable hardware, software, or combination of hardware and software to support, enable or provide for the connection and use of multiple display devices 124a-124n by the computing device 100.

In further embodiments, an I/O device may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, an Infiband interconnect fabric, a Myrinet interconnect fabric, or a Serial Attached small computer system interface bus.

A computing device 100 of the sort depicted in FIG. 1 typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA all of which are manufactured by Microsoft Corporation of Redmond, Wash.; MAC OS, manufactured by Apple Computer of Cupertino, Calif.; OS/2, manufactured by International Business Machines of Armonk, N.Y.; Solaris Operating System, manufactured by Sun Microsystems, Inc. of Santa Clara, Calif.; and Linux, a freely-available operating system distributed by Caldera Corp. of Salt Lake City, Utah, or any type and/or form of a Unix operating system, among others. In some embodiments, the computing device 100 operates under the control of an operating system supporting parallel processing. In one of these embodiments, the operating system provides functionality for managing shared resources, scheduling, and coordination of processing performed by multiple processors. In other embodiments, the computing device 100 operates under a minimal Basic Input/Output System but has the ability to load a standard operating system, such as WINDOWS CE or other WINDOWS operating system.

The computing device 100 can be any workstation, desktop computer, laptop or notebook computer, server, handheld computer, mobile telephone, game console, any other computer, or other form of computing or telecommunications device that is capable of communication and that has sufficient processor power and memory capacity to perform the operations described herein.

Figure 2:
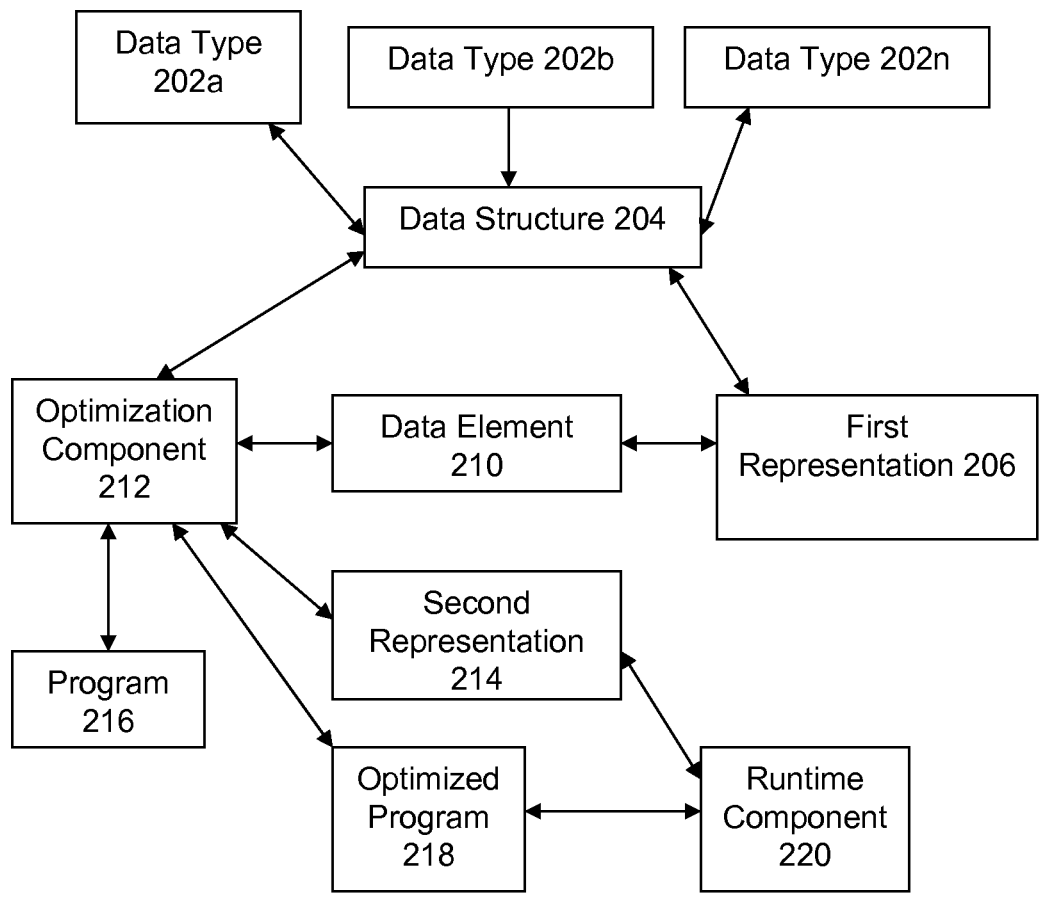
FIG. 2 is a block diagram depicting one embodiment of a system for optimizing data access.

Referring now to FIG. 2, a block diagram depicts one embodiment of a system for optimizing data accesses. In brief overview, the system includes a plurality of data types 202a-202n, a data structure 204, a first representation 206, at least one data element 210, an optimization component 212, a second representation 214, a program 216, an optimized program 218, and a runtime component 220. The data structure 204 provides access to at least one data element 210. The first representation 206 of the at least one data element is associated with the data structure 204. The plurality of data types 202 provide access to the at least one data element 210. The second representation 214 of the at least one data element 210 is generated responsive to at least one of the plurality of data types 202.

A user is provided with a plurality of data types 202 for accessing the at least one data element. In one embodiment, the user generates a program—a collection of computations—using at least one of the plurality of data types 202 to access the at least one data element 210. In another embodiment, the program includes code for reading, writing, modifying or otherwise operating on the at least one data element 210. In still another embodiment, the system for optimizing data accesses receives the program.

In one embodiment, an optimization component 212 includes a code generator that generates an optimized schedule of operations and selects a data layout from a plurality of data layout options. In another embodiment, an optimization takes place when a program 216 is combined, either statically or dynamically, with an actual source of data through a particular access pattern. Requests to combine a program 216 with a source of data and execute it may be dynamically specified by a user.

In some embodiments, the optimization component 212 analyzes the program. In one of these embodiments, the optimization component 212 analyzes a data structure 204 associated with the at least one of the plurality of data types 202 and providing an internal representation of the at least one of the plurality of data types 202. In another of these embodiments, the optimization component 212 analyzes a plurality of data types used in the program. In still another of these embodiments, the optimization component 212 analyzes the data element 210. In still even another of these embodiments, the optimization component 212 analyzes a target processing unit that will perform the requested operations. In yet another of these embodiments, the optimization component 212 generates an optimized representation of the at least one data element for use in performing the requested operation on the at least one data element 210, the representation optimized responsive to at least one analysis performed by the optimization component 212. In further embodiments, the optimization component 212 generates an optimized representation of the at least one data type for use in performing the requested operation on the at least one data element 210, the representation optimized responsive to at least one analysis performed by the optimization component 212.

Figure 3:
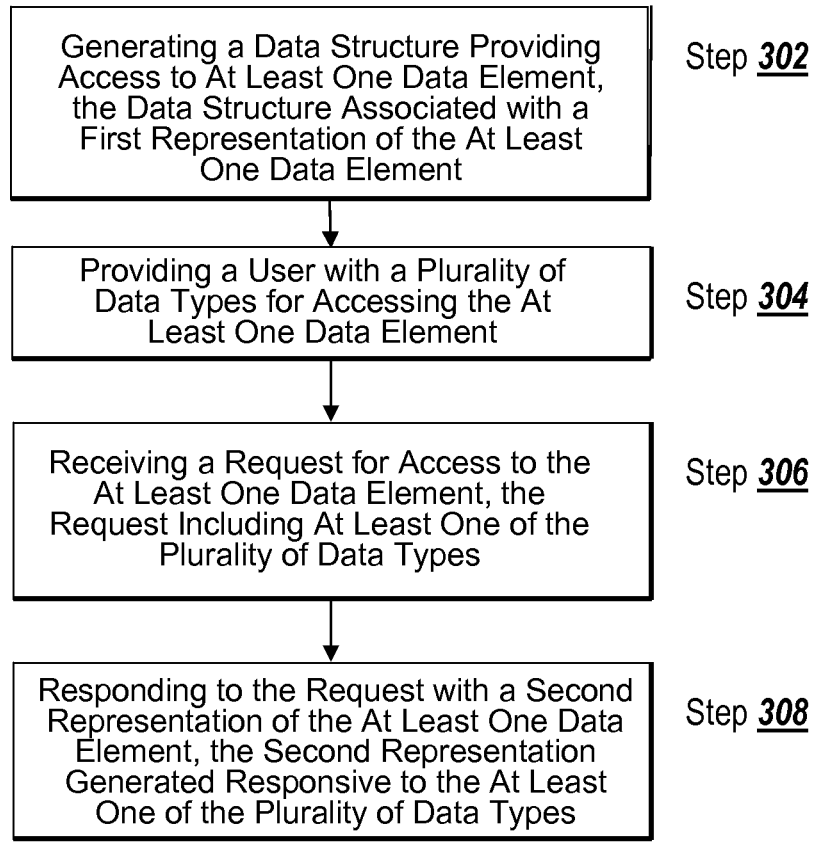
FIG. 3 is a flow diagram depicting one embodiment of the steps taken in a method for optimizing data types.

Referring now to FIG. 3, and in conjunction with FIG. 2, a flow diagram depicts one embodiment of the steps taken in a method for optimizing data types. In brief overview, a data structure providing access to at least one data element is generated, the data structure associated with a first representation of the at least one data element (step 302). A user is provided with a plurality of data types for accessing the at least one data element (step 304). A request for access to the at least one data element is received, the request including at least one of the plurality of data types (step 306). The request is responded to with a second representation of the at least one data element, the second representation generated responsive to the at least one of the plurality of data types (step 308).

A data structure 204 providing access to at least one data element 210 is generated, the data structure associated with a first representation 206 of the at least one data element 210 (step 302). In one embodiment, the data structure 204 is a node. In another embodiment, the data structure 204 is referred to as an array node. In still another embodiment, the data structure 204 provides access to the at least one data element 210 by providing access to the plurality of data types 202. In yet another embodiment, the data structure 204 provides access to the at least one data element 210 by providing access to the first representation 206.

In one embodiment, the first representation 206 of the at least one data element 210 is referred to as an array source 206. In another embodiment, an array node 204 is associated with an array source 206. In still another embodiment, a plurality of array nodes 204 are associated with an array source 206. In still even another embodiment, an array node 204 is referred to as an owner of its associated array source 206. In yet another embodiment, an array source 206 provides a representation of at least one element exposed through an array node 204. In some embodiments, elements of an array node may include any form of data, including fixed-size data, such as sequences of basic types including floating point numbers and integers or any other bit pattern. In other embodiments, elements may also include recursive containers, including sequences of different types and other arrays. In one of these embodiments, the elements may be of variable size.

In some embodiments, the first representation 206 identifies a method for generating the at least one data element 210. In one of these embodiments, an array source 206 specifies how to generate an element in an array node 204 associated with the array source 206. In another of these embodiments, a method for generating the at least one data element 210 generates the element given its position in an array (for example, so that the array appears to contain a sequence of natural numbers), or any other function of such positions, for example, a sequence of pseudo-random numbers or quasi-random numbers generated by a hash function of position. In still another of these embodiments, a generating function may also generate a constant.

In other embodiments, the first representation 206 identifies a status of an initialization process of the data structure 204 providing access to the at least one data element 210. In one of these embodiments, an invalid, or null, array source 206 indicates that an associated array node 204 is uninitialized. In another of these embodiments, an invalid, or null, array source 206 indicates that an associated array node 204 is partially initialized. In still another of these embodiments, an array source 206 generated by default may be a null source 206. In still even another of these embodiments, an array node 204 generated by default may be associated with a null source

206. In yet another of these embodiments, storage for an array source 206 is only allocated as an array is accessed. For example, an array may be stored as a set of tiles, with uninitialized tiles represented with null sources. Physical storage for tiles only needs to be allocated when these locations are written to, and when read such uninitialized array nodes can generate arbitrary data or an error can be signal. In further embodiments, uninitialized array sources 206 represent the state of the array, indicating that the actual storage has not been allocated or written.

In some embodiments, the first representation 206 stores a constant. In other embodiments, the first representation 206 stores data of a fixed size. In still other embodiments, the data includes the at least one data element 210 provided by the associated data structure 204. In still even other embodiments, the at least one data element 210 comprises data distributed over multiple storage locations. In yet other embodiments, the first representation 206 stores data of variable size.

In one embodiment, the first representation 206 includes an array of indices. In another embodiment, the first representation 206 includes a representation of an array of indices. In still another embodiment, the first representation 206 includes a representation of an array representing an index to a second array. In still even another embodiment, the first representation 206 includes a pointer to an array indexing the at least one data element 210. In yet another embodiment, the first representation 206 includes a pointer to an array indexing a second array. In some embodiments, the first representation 206 provides an index for a second array node 202b'. In other embodiments, the first representation 206 includes an array of indices that is conceptually unbounded. In one of these embodiments, the array of indices is computed, rather than stored in memory.

In some embodiments, a transformation is applied to an array indexing the at least one data element 210. In one of these embodiments, the at least one data element 210 is a second array. In one embodiment, to access certain elements of an array, an affine transformation is applied to an index of the array (for example, by multiplying a data element in the index by two and adding one to access the odd elements of the array). In another of these embodiments, non-affine transformations are applied to array indices. In still another of these embodiments, the array indices are multidimensional. In still even another of these embodiments, a multidimensional affine transformation is represented as a matrix is applied using a matrix-vector multiplication to multidimensional indices represented as a vector extended with a homogeneous coordinate. In yet another of these embodiments, non-affine multidimensional transformations are applied to an index. In further embodiments, a multidimensional affine transformation is represented as a matrix and an offset vector and applied using a matrix-vector multiplication and a vector addition to multidimensional indices represented as a vector.

In other embodiments, a data type 202b in the plurality of data types 202 is associated with an identification of a transformation. In one of these embodiments, the array node 202b stores the transformation. In still other embodiments, an optimized representation is generated using the transformation. In one of these embodiments, a request for an operation on a data element 210 includes a request for the application of a transformation to the data element 210. In yet other embodiments, indirect transformations are applied to a data element 210 through proxy sources. In further embodiments, the transformations will be taken into account during certain operations on elements of the array. In one of these embodiments, the result of performing the transformation is stored and the transformation becomes an identity.

In one embodiment, the first representation 206 stores a copy of the at least one data element 210. In some embodiments, the first representation 206 stores a procedurally-generated version of the at least one data element 210. In one of these embodiments, the first representation 206 of the at least one data element 210 includes a representation of a procedurally-generated sequence of numbers. In another of these embodiments, the first representation 206 stores a procedurally-generated copy of the at least one data element 210, the copy including at least one pseudo-random number. In still another of these embodiments, the first representation 206 stores a procedurally-generated copy of the at least one data element 210, the copy including at least one constant.

In one embodiment, the first representation 206 is stored remotely from the at least one data element 210. In another embodiment, the first representation 206 is stored on a disk storing the at least one data element 210. In another embodiment, the first representation 206 of the at least one data element 210 stores a representation of the at least one data element 210, the at least one data element 210 stored on a disk identified by the first representation 206.

In some embodiments, the first representation 206 represents a copy of at least one data element 210 provided by a second array node 202b'. In one of these embodiments, the first representation 206 is associated with a second data structure 204' providing access to a second data element 210'. In another of these embodiments, the first representation 206 includes an identification of a representation of a second data element 204'. In still another of these embodiments, the first representation 206 stores a copy of a second data element 210', the second data element 210' also associated with a second representation 206'. In still even another of these embodiments, the first representation 206 stores a copy of a second data element 210' provided by a second data structure 204'.

In some embodiments, an array source 206 representing a copy of a data element associated with a second array node 204' is referred to as a proxy source 206. In one of these embodiments, a proxy source represents multiple layers of access patterns. In another of these embodiments, requests for certain operations on the at least one data element 210 require converting a proxy source 206 associated with the at least one data element 210—and, in some embodiments, storing a reference to the at least one data element 210—to an array source 206 storing a copy of the at least one data element 210.

A user is provided with a plurality of data types for accessing the at least one data element (step 304). In some embodiments, a data type 202a in the plurality of data types 202 has by-value semantics for copying and when one array is assigned to another, it is as if the data was copied, and all prior data in the array is destroyed. In some of these embodiments, the new value of the array may have a new size. In others of these embodiments, the data is copied to the target array.

In one of these embodiments, the data type 202a is referred to as an array. In another of these embodiments, the data type 202a represents a variable-size, multidimensional set of indexed homogeneous data. In still another of these embodiments, the data type 202a represents a variable-size, multidimensional set of indexed data of a user-defined inhomogeneous type. In another of these embodiments, the data type 202a stores a copy of the at least one data element. In still even another of these embodiments, the data type 202a is a container for a plurality of data elements 210. In yet another of these embodiments, the array 202a mimics a C++ container. In other embodiments, an array 202a has by-copy assignment semantics. In one of these embodiments, an operation performing a copy for array 202a may be optimized to defer the copy. In another of these embodiments, an operation performing a copy for array 202a may be optimized to minimize the amount of copying required by the array 202a.

In other embodiments, a data type 202b in the plurality of data types 202 has by-reference semantics, and when one array is assigned to another, the array assigned to will refer to the storage location of the original array; the assignment is that of a pointer to the original data. In one of these embodiments, the data type 202b is referred to as an accessor 202b. In another of these embodiments, an accessor 202b represents a subset of a data element 210 represented by an array 202a. In still another of these embodiments, an accessor 202b stores a subset of a data element 210. In still even another of these embodiments, the accessor 202b mimics groups of C++ iterators.

In still other embodiments, a data type 202c in the plurality of data types 202 provides dereferenced access to the at least one data element 210. In one of these embodiments, the data type 202c is referred to as a chunk. In another of these embodiments, the chunk 202c is a dereferenced accessor 202b. In still another of these embodiments, an operator is provided for dereferencing an accessor 202b to generate a chunk 202c. In some embodiments, the chunk 202c has content-modifying assignment semantics. In one of these embodiments, content-modifying semantics modify a storage location in-place and are similar to by-value assignments, except that not all of the data is necessarily modified.

In some embodiments, each data type in the plurality of data types 202 is associated with the same data structure 204. In one of these embodiments, each data type in the plurality of data types 202 is associated with the same first representation 206. In other embodiments, each data type in the plurality of data types 202 is associated with a separate data structure 204. In one of these embodiments, each data type in the plurality of data types 202 is referred to as an owner of its data structure 204. In another of these embodiments, each data structure 204 is associated with a separate first representation 206. In still another of these embodiments, each data structure 204 is associated with a single first representation 206.

In one embodiment, a plurality of array nodes 204 provides access to at least one data element 210, each array node 204 in the plurality of array nodes 204 associated with a data type in the plurality of data types 202. In another embodiment, the plurality of array nodes 204 is a plurality of nodes in a closed, doubly-linked list, which may be referred to as a ring. In still another embodiment, the plurality of array nodes 204 is stored in an alternative data type supporting equivalent abstract operations as a doubly-linked list.

In other embodiments, the data structure 204 providing access to the at least one data element 210 is associated with the plurality of data types 202. In one of these embodiments, the data structure 204 providing access to the at least one data element 210 provides the user with the plurality of data types 202. In another of these embodiments, an array node 204 is associated with an array 202a, an accessor 202b and a chunk 202c provided to a user. In still another of these embodiments, an array node 204 provides a representation of an array 202a. In yet another of these embodiments, array node 204 provides a representation of an accessor 202b. In still other embodiments, an array 202a, an accessor 202b, and a chunk 202c are associated with a single array node 204, which provides a common representation for the array 202a, the accessor 202b, and the chunk 202c.

In some embodiments, a data type in the plurality of data types 202 is associated with an identification of an affine transformation. In one of these embodiments, the data type 202n stores a copy of the at least one data element 210 to which an affine transformation is applied. In other embodiments, a data type in the plurality of data types 202 is associated with an identification of a non-affine transformation. In one of these embodiments, the data type 202n stores a copy of the at least one data element 210 to which a non-affine transformation is applied.

In one embodiment, a data type in the plurality of data types 202 is associated with an identification of a size of a subset of the at least one data element 210. In another embodiment, a data type in the plurality of data types 202 is associated with an identification of a region of a subset of the at least one data element 210. In still another embodiment, a data type in the plurality of data types 202 is associated with an identification of a region of a subset of the at least one data element 210, the region specified by a user. In still even another embodiment, a data type in the plurality of data types 202 is associated with an identification of a stride of an array. In yet another embodiment, a data type in the plurality of data types is associated with an identification of an offset within an array.

In some embodiments, a data type 202 is associated with an identification of a region of a subset of the at least one data element 210, with a stride of an array provided by the data type, and with an offset within the array. In one of these embodiments, the identification of the region, the identification of the stride, and the identification of the offset are referred to as an access pattern. In another of these embodiments, the data type 202 has an access pattern allowing a user to access an arbitrary regular pattern of an array. In still another of these embodiments, the access pattern is associated with a multidimensional affine transformation. In still even another of these embodiments, the data type 202 associated with the access pattern is an accessor 202b. In other embodiments, an array node 204 associated with a data type in the plurality of data types 202 stores an access pattern. In one of these embodiments, the array node 204 is associated with an array 202a. In another of these embodiments, the array node 204 is associated with a chunk 202c. In still another of these embodiments, the array node 204 is associated with an accessor 202b. In yet another of these embodiments, multiple levels of nested access patterns are represented using a proxy source 206.

In one embodiment, a data type in the plurality of data types 202 is associated with an identification of a boundary condition. In some embodiments, a boundary condition includes, but is not limited to, one of the following: undefined, safe undefined, checked undefined, constant, repeat, clamp. In one of these embodiments, an undefined boundary condition specifies that writes outside the boundary are unsafe and may corrupt the execution environment of the program and reads will return undefined results. In another of these embodiments, a safe undefined boundary condition is similar to the undefined boundary condition; however, writes outside the boundary will have no effect and will not corrupt the execution environment of the program. In still another of these embodiments, the checked undefined boundary condition is similar to the safe undefined boundary condition; however, attempts to read or write outside the boundaries will result in an error being flagged. In still even another of these embodiments, the constant boundary condition is similar to the safe undefined boundary condition for reads; however, the condition returns a user-specified constant for reads outside the boundary. In still another embodiment, the repeat boundary condition toroidially wraps all accesses outside the boundary to accesses inside the boundary. In yet another embodiment, the clamp boundary condition maps all accesses outside the boundary to the closest point on the boundary.

In one embodiment, a boundary is an infinite area outside of a defined size of an array 202*a*. In another embodiment, a data type in the plurality of data types 202 is associated with an identification of an action taken when a request is received to read or write a data element outside of a boundary of an array 202*a*. In still another embodiment, the identification may be referred to as a boundary mode. In some embodiments, data supporting a boundary condition is generated and maintained. In one of these embodiments, for example, a boundary constant is generated and used to return an appropriate value during reads outside of the boundary.

A request for access to the at least one data element is received, the request including at least one of the plurality of data types (step 306). In one embodiment, the request is included in a program 216. In another embodiment, the request is for computation of an operation on the at least one data element.

In one embodiment, an optimization component 212 receives the program 216. In another embodiment, the program 216 is an object that represents a sequence of operations, including memory access operations to sources of data. In still another embodiment, before the program 216 is bound to a data source its access to memory is abstract. In still even another embodiment, once the program 216 is bound to a concrete source of data, the optimization component 212 generates a concrete program, the optimized program 218, that uses the specific arrangement of the data and the access pattern specified via the plurality of data types 202*a-n* for efficient access. In yet another embodiment, the optimization component 212 selects among several concrete data layouts in order to enable the most efficient concrete program, and it might select among these options using dynamic runtime data (for instance, the repeated use of a specific access pattern by the user). A runtime component 220 executes the optimized program 218.

In some embodiments, the request is a request for an assignment of a value to the at least one data element 210. In one of these embodiments, the request identifies an accessor 202*b* and requests an assignment of a value to the at least one data element 210. In this embodiment, a new array node 204' is generated with the same array source 206 as an array node 204 associated with the accessor 202*b*. In another of these embodiments, the request identifies a chunk 202*c* and requests an assignment of a value to the at least one data element 210 associated with the chunk 202*c*. In this embodiment, the value is copied from a source location to the at least one data element 210.

As described above, in some embodiments, an array source 206 representing a copy of a data element associated with a second array node 204', and representing multiple layers of access patterns, is referred to as a proxy source 206. In one of these embodiments, the request is for an assignment of a value to the at least one data element 210 and identifies, as a source of the value, an array node 204, which is associated with a proxy source 206. In another of these embodiments, the array node 204 is assigned to a new array source 206, which is a memory source 206' with the same size as the period of the underlying proxy node. In still another of these embodiments, a copy is made from the array node 202*a* to the memory source 206'. In still even another of these embodiments, all nodes in a ring with which the array node 204 is associated are set to have a default multidimensional affine transformation. For example, all of the nodes in the ring may be set to have a default period, offset and stride. In yet another of these embodiments, the source array node 204 is said to have been collapsed when the array node 204 is associated with the memory source 206', the copy is made from the array node 204 to the memory source 206', and the nodes in the array node 204 are associated with the default access pattern. In further embodiments, the target node identified in the request becomes a new array node 204", which has a proxy source 206" including a reference to the source array node 204.

In still other embodiments, the request is a request to copy the at least one data element. In one of these embodiments, a copy is made by copying data directly to a host processor. In another of these embodiments, a copy is made by copying data to a target processor. In still another of these embodiments, an optimization component 212 may determine that a request to make a copy of the at least one data element should be deferred until a later, more optimal time. The optimization component 212 may make a determination as to whether and how to respond to a request to copy the at least one data element 210 responsive to one of: an analysis of a type of first representation 206 associated with the at least one data element 210, an analysis of a location of a destination memory and of a source memory location, an analysis of a boundary condition associated with a source memory location, and an analysis of an access pattern associated with the at least one data element 210. In yet another of these embodiments, copying the at least one data element 210 triggers an error. For example, an error may be triggered if the source and destination sizes do not match, or if a boundary condition associated with the source location does not allow a reading of a requested location, or if an access pattern associated with a destination or source location force the copy to go out-of-bounds. Errors can be reported to the user by setting a flag or throwing an exception, or by some other mechanism.

In yet other embodiments, the request is a request to construct at least one of the plurality of data types. In one of these embodiments, an array 202*a* is constructed. In another of these embodiments, the constructed array 202*a* has a given size. In still another of these embodiments, the array 202*a* is associated with physically allocated memory, represented by a memory source. The physically allocated memory might reside in a number of different places, depending on the system configuration; for example, in the host memory, in an accelerator memory, or in a remote memory. In yet another of these embodiments, an array is allocated with a specific size, although the actual allocation is deferred to a more optimal time as determined by an optimization component 212.

In another of these embodiments, the request includes an explicit instruction to construct an accessor 202*b*. In still another of these embodiments, an accessor 202*b* is constructed by an access pattern generator function. In still even another of these embodiments, the request includes an instruction to dereference an accessor 202*b*, resulting in the construction of a chunk 202*c*.

In some embodiments, a default accessor 202*b* and chunk 202*c* are constructed without arguments, but are invalid. In one of these embodiments, the default accessor 202*b* and chunk 202*c* are constructed when an array 202*a* is constructed. In another of these embodiments, the default accessor 202*b* and chunk 202*c* are constructed when the array 202*a* is accessed. In still another of these embodiments, the initialization of the default accessor 202*b* and chunk 202*c* is deferred until they are accessed. In yet another of these embodiments, the default accessor 202*b* and chunk 202*c* are created without arguments and are set to a state indicating that they have not yet been fully initialized.

In some embodiments, the optimization component 212 performs reference counting to determine whether to maintain an array source 206 or an array node 204. In one of these embodiments, a reference count is a number maintained in an object that is incremented whenever a new reference to the object is created and decremented whenever a reference is released. In another of these embodiments, a reference count of the array source 206 results in a count of the number of rings with which the array source is associated. In still another of these embodiments, an array source 206 is maintained as long as it is associated with at least one data type 202. In yet another of these embodiments, an array node 204 is maintained as long as it is associated with at least one data type 202. In further embodiments, the optimization component 212 may maintain references, but so might other components of the system, including the user. In some embodiments, specific optimizations can be made if all references can be accounted for. In other embodiments, memory can be released if the reference count goes to zero; this is a simple form of "garbage collection", also known as automatic memory management.

The request is responded to with a second representation 214 of the at least one data element 210, the second representation 214 generated responsive to the at least one of the plurality of data types 202 (step 308). In some embodiments, the second representation 214 is an optimized representation 214 of the at least one data element 210. In one of these embodiments, the optimized representation 214 is generated responsive to an analysis of a hardware component on which the at least one data element 210 resides. In another of these embodiments, the optimized representation 214 is generated responsive to an analysis of an access pattern of the at least one data element 210. In still another of these embodiments, the optimized representation 214 is generated responsive to an analysis of a memory layout of the at least one data element 210. In still even another of these embodiments, the optimized representation 214 is generated responsive to an analysis of the at least one data element 210. In yet another of these embodiments, the optimized representation 214 is generated responsive to an analysis of a modification to the at least one data element 210. In further embodiments, the optimized representation 214 is generated responsive to an analysis of an interaction between two data types referenced in the program including the request for access to the at least one data element 210.

In some embodiments, the request for access to the at least one data element includes a data type in the plurality of data types 202 having by-reference semantics. In one of these embodiments, the data type included in the request is an accessor 202b. In another of these embodiments, the optimization component 212 determines that the response to the request should include a copy of the at least one data element. In still another of these embodiments, the accessor 202b, having by-reference semantics, returns a copy of a subset of the at least one data element 210. In still even another of these embodiments, the optimization component 212 determines that the response to the request should include a reference to the at least one data element 210. In yet another of these embodiments, the accessor 202b returns a pointer to the at least one data element 210.

In some embodiments, the optimization component 212 performs the analysis of the data element, the data types in the program, and the program. In one of these embodiments, the optimization component 212 identifies an optimization that would improve the data access—such as deferring a command to copy data, replacing a data type in the program with a data type having different assignment semantics, eliminating a deferred operation which is no longer required, or generating an optimized data structure representing the data element.

In one embodiment, the optimization component 212 determines that a data type having a particular assignment semantic provides an optimized data access. In another embodiment, the optimization component 212 generates a second representation 214 having an assignment semantic selected responsive to the at least one of the plurality of data types included in the request. In still another embodiment, the optimization component 212 identifies a data type having the particular assignment semantic and providing access to a second representation 214 of the at least one data element 210. In yet another embodiment, the request is responded to with the second representation 214 provided by the identified data type. In some embodiments, the second representation 214 is an optimized data type providing a more efficient mechanism for accessing the data element. In other embodiments, the second representation 214 is an optimized representation of the data element. In still other embodiments, the second representation 214 represents the result of performing the requested computation on the data element, using optimized techniques selected responsive to an analysis of the requested computation.

In some embodiments, the optimization component 212 returns an optimized representation of the data element 210 in response to the request. In one of these embodiments, the optimization component 212 returns an optimized representation of a modified version of the data element 210 in response to the request. In other embodiments, the optimization component 212 returns an optimized representation of the data element 210 in response to a request included in a program, the optimized representation having by-reference semantics. In one of these embodiments, the optimized representation is an array. In another of these embodiments, changes to the at least one data element 210 are no longer visible to later invocations of the program. In still other embodiments, the optimization component 212 returns an optimized representation of the data element 210 in response to a request included in a program, the optimized representation having by-value semantics. In one of these embodiments, the optimized representation is an array. In another of these embodiments, changes to the at least one date element 210 are visible to later invocations of the program. In still another of these embodiments, the optimized representation is a non-local variable reference. In yet other embodiments, the optimization component 212 returns an optimized representation of the data element 210 in response to a request included in a program, the optimized representation having assignment semantics selected responsive to an analysis of a data type included in the program. In one of these embodiments, optimal assignment semantics are selected responsive to an analysis of an interaction between a plurality of data types included in the program.

In some embodiments, the optimization component 212 returns the optimized representation 214 of the data element within an optimized version 218 of the program 216. In one of these embodiments, the optimization component 212 generates the optimized program 218 using optimized techniques selected responsive to an analysis of at least one of the requested computation, a data type 202 included in the program 216, a data structure 204, and a first representation 206. In another of these embodiments, the optimization component 212 provides the optimized program 218 to a runtime component 220. In still another of these embodiments, the runtime component 220 accesses the second representation 214 when executing the optimized program 218.

Figure 4:
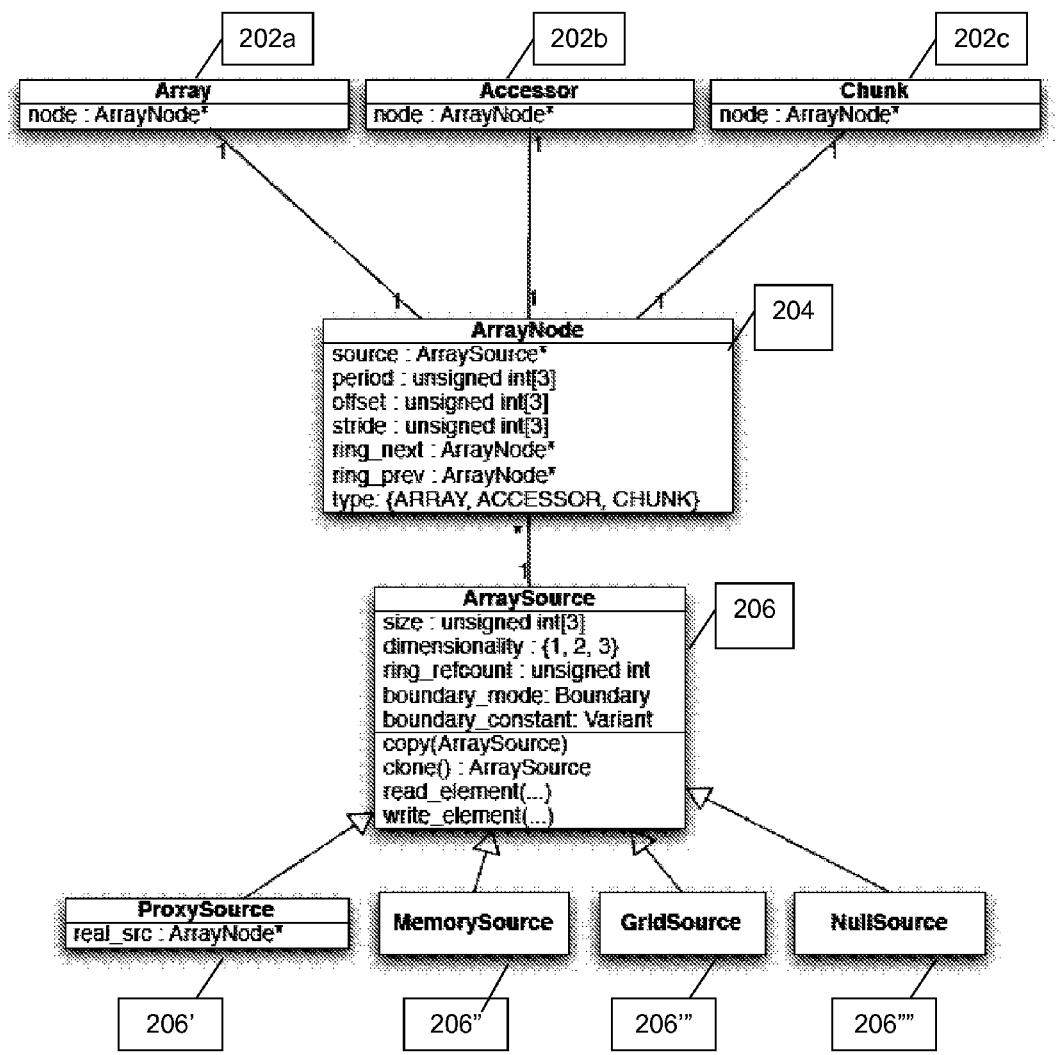
FIG. 4 is a block diagram depicting one embodiment of a data structure providing access to a data element, a plurality of data types, and a representation of the data element.

Referring now to FIG. 4, a block diagram depicts one embodiment of a data structure providing access to a data element, a plurality of data types, and a representation of the data element. As shown in FIG. 4, an array node 204 provides access to a data element represented by array source 206. In one embodiment, the array node 204 specifies a multidimensional affine transformation associated with, or applied to, the at least one data element 210. In another embodiment, the array node 204 specifies the access pattern—the stride, offset, and period—associated with the at least one data element 210. The array node 204 also specifies the types with which it is associated—an array 202a, an accessor 202b, and a chunk 202c. Although FIG. 4 enumerates only three properties of the at least one data element 210—the offset, period, and stride—it should be understood that the system may provide multiple ones of any or each of those properties or of other properties associated with the at least one data element 210. Similarly, although FIG. 4 shows an array node 204 enumerating a period of 3, it should be understood that the period is a vector for the dimension of the array N while offset and stride may be generalized into a N×(N+1) array for arbitrary affine transformations.

The array source 206 identifies several properties of at least one data element 210, including size, dimensionality, reference count, boundary mode, and operations performed on the at least one data element such as copying, cloning, reading an element from the array, and writing a value to an element of the array. Although FIG. 4 identifies a dimensionality of 3, it should be understood that the at least one data element 210 may be multidimensional and is not limited to a dimensionality of three. The array source 206 is associated with a proxy source 206', a memory source 206", a grid source 206''', and a null source 206''''. In one embodiment, the proxy source 206' includes a pointer to the array node 204 and is associated with a second data element represented by the array node 204. In another embodiment, a memory source 206" represents memory that is actually allocated. In still another embodiment, the memory source 206" is a representation of undifferentiated memory that identifies in what physical memory data is stored. In still another embodiment, a grid source 206''' is a generated source 206 that returns an index of a location as its value. In still even another embodiment, a null source 206'''' represents an uninitialized source. In yet another embodiment, the null source 206'''' indicates that an array source 206 is associated with a second node that has not been completely initialized.

The systems and methods described above may be implemented as a method, apparatus or article of manufacture using programming and/or engineering techniques to produce software, firmware, hardware, or any combination thereof. The systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. In general, the computer-readable programs may be implemented in any programming language, LISP, PERL, C, C++, PROLOG, or any byte code language, such as JAVA. The software programs may be stored on or in one or more articles of manufacture as object code.

Having described certain embodiments of methods and systems for optimizing data types, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method performed by a processor for optimizing data accesses, the method comprising:
   providing a user with a plurality of data types for accessing a data element, the data element including a data structure associated with a first representation having array indices of the data element;
   receiving a request for access to the data element, the request including at least one of the plurality of data types and an assignment operation to be performed on the data element via the one of the plurality of data types and an identifier of an operation to access the data element via a data type;
   performing a transformation on the array indices of the first representation based on operation to access the data element via a data type; and
   responding to the request with a second representation of the data element generated responsive to the one of the plurality of data types, the second representation having the transformed array indices of the first representation.

2. The method of claim 1, wherein responding to the request further comprises responding with another of the plurality of data types having an assignment semantic selected based on the one of the plurality of data types, wherein the selected assignment semantic is one of: a by-reference, a by-value, or a content-modifying assignment semantic.

3. The method of claim 1, wherein responding to the request is further based on an analysis of one or more processor cores that are to execute the assignment operation.

4. The method of claim 1, wherein responding to the request is further based on an analysis of an access pattern identified from runtime data of a program with the assignment operation.

5. The method of claim 1, wherein responding to the request is further based on an analysis of a hardware component on which the data element resides.

6. The method of claim 1, wherein responding to the request is further based on an analysis of a location of a source memory and a destination memory for the assignment operation.

7. The method of claim 1, wherein responding to the request is further based on a memory layout of the data element.

8. An article of manufacture comprising a non-transitory computer-readable storage medium having content stored thereon, which when executed causes a machine to perform operations including:
   providing a user with a plurality of data types for accessing a data element, the data element including a data structure associated with a first representation having array indices of the data element;
   receiving a request for access to the data element, the request including at least one of the plurality of data types and an assignment operation to be performed on the data element via the one of the plurality of data types and an identifier of an operation to access the data element via a data type;

performing a transformation on the array indices of the first representation based on operation to access the data element via a data type; and responding to the request with a second representation of the data element generated responsive to the one of the plurality of data types, the second representation having the transformed array indices of the first representation.

9. The article of manufacture of claim 8, wherein responding to the request further comprises responding with another of the plurality of data types having an assignment semantic selected based on the one of the plurality of data types, wherein the selected assignment semantic is one of: a by-reference, a by-value, or a content-modifying assignment semantic.

10. The article of manufacture of claim 8, wherein responding to the request is further based on an analysis of one or more processor cores that are to execute the assignment operation.

11. The article of manufacture of claim 8, wherein responding to the request is further based on an analysis of an access pattern identified from runtime data of a program with the assignment operation.

12. The article of manufacture of claim 8, wherein responding to the request is further based on an analysis of a hardware component on which the data element resides.

13. The article of manufacture of claim 8, wherein responding to the request is further based on an analysis of a location of a source memory and a destination memory for the assignment operation.

14. The article of manufacture of claim 8, wherein responding to the request is further based on a memory layout of the data element.

15. A system comprising:
a memory including a data structure providing having at least one data structure; and
a processor to perform:
providing a user with a plurality of data types for accessing a data element, the data element including a data structure associated with a first representation having array indices of the data element;

receiving a request for access to the data element, the request including at least one of the plurality of data types and an assignment operation to be performed on the data element via the one of the plurality of data types and an identifier of an operation to access the data element via a data type;

performing a transformation on the array indices of the first representation based on operation to access the data element via a data type; and responding to the request with a second representation of the data element generated responsive to the one of the plurality of data types, the second representation having the transformed array indices of the first representation.

16. The system of claim 15, wherein responding to the request further comprises responding with another of the plurality of data types having an assignment semantic selected based on the one of the plurality of data types, wherein the selected assignment semantic is one of: a by-reference, a by-value, or a content-modifying assignment semantic.

17. The system of claim 15, wherein responding to the request is further based on an analysis of one or more processor cores that are to execute the assignment operation.

18. The system of claim 15, wherein responding to the request is further based on an analysis of an access pattern identified from runtime data of a program with the assignment operation.

19. The system of claim 15, wherein responding to the request is further based on an analysis of a hardware component on which the data element resides.

20. The system of claim 15, wherein responding to the request is further based on an analysis of a location of a source memory and a destination memory for the assignment operation.

21. The system of claim 15, wherein responding to the request is further based on a memory layout of the data element.

* * * * *